(No Model.)  
T. S. & W. P. COLEMAN.  
PLUMBING SYSTEM.
No. 570,455. Patented Nov. 3, 1896.
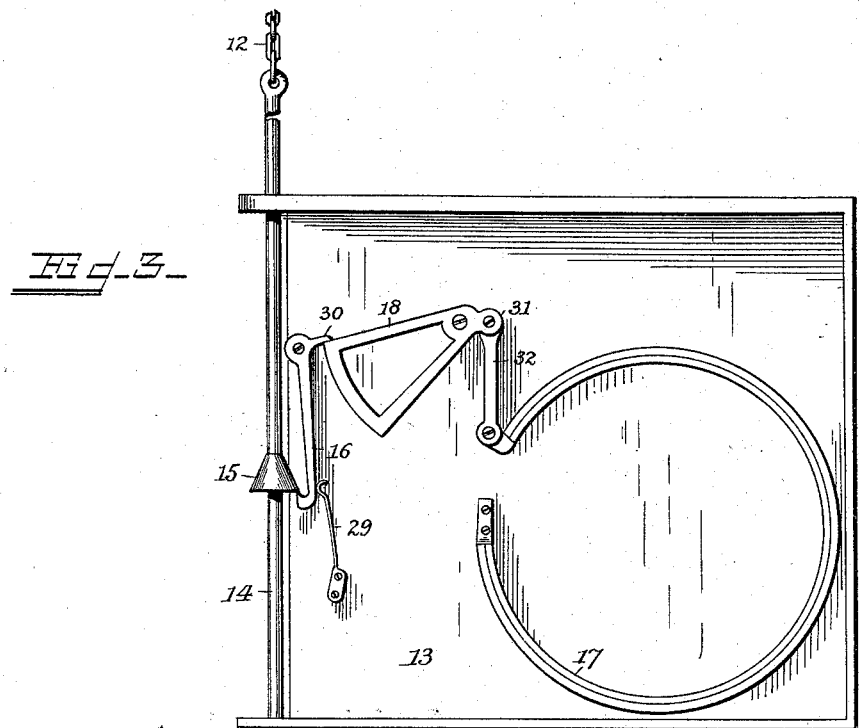
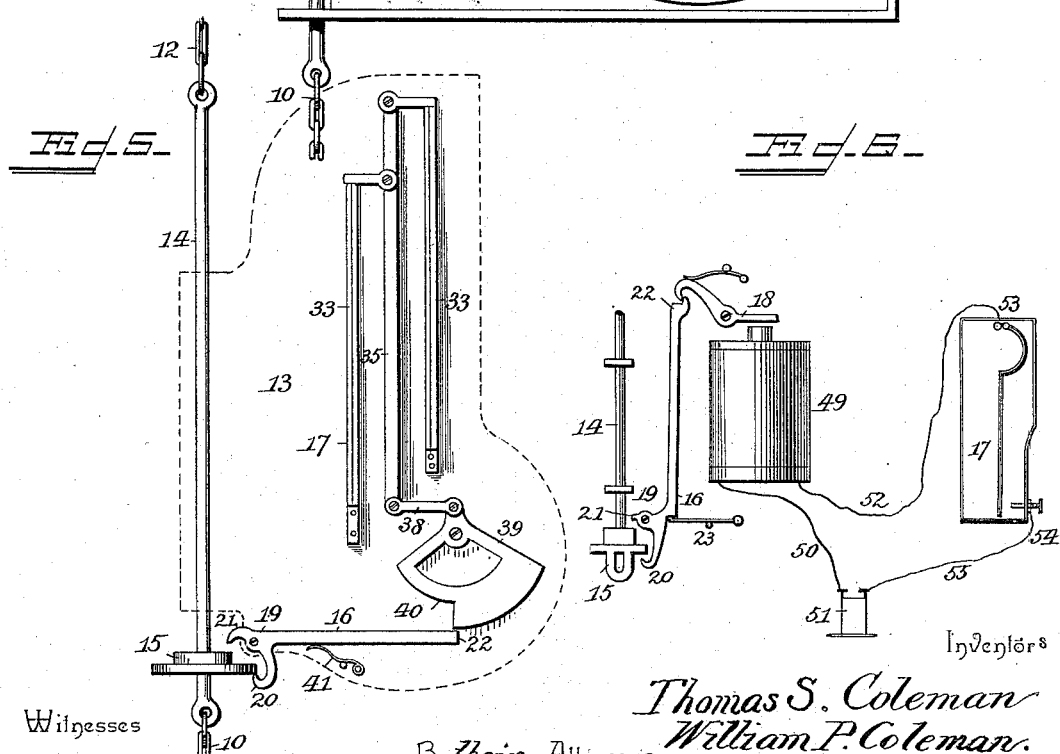
Witnesses  
Chas H. Ourand  
V. B. Hillyard
Inventors  
Thomas S. Coleman  
William P. Coleman  
By their Attorneys  
C. A. Snow & Co.

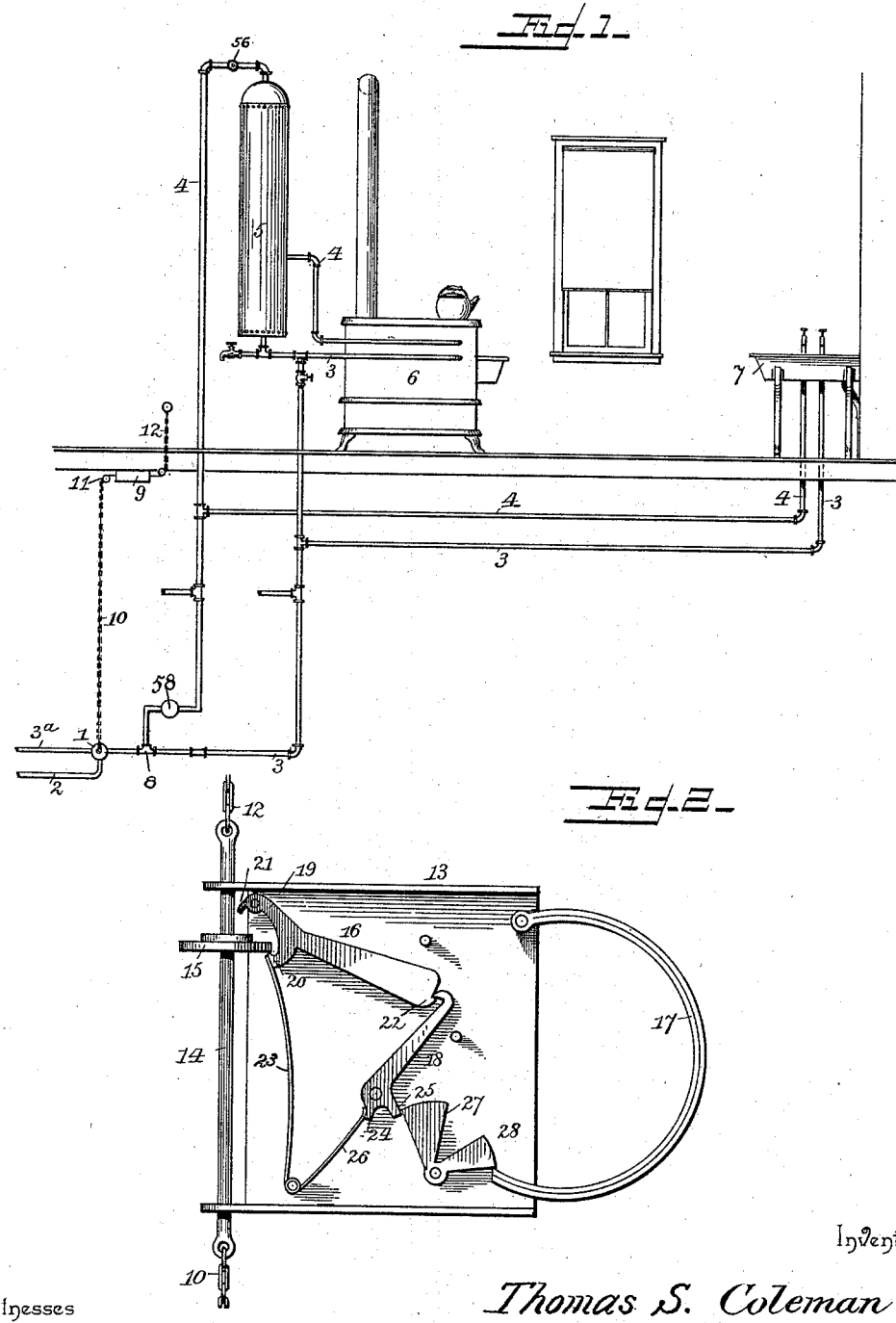

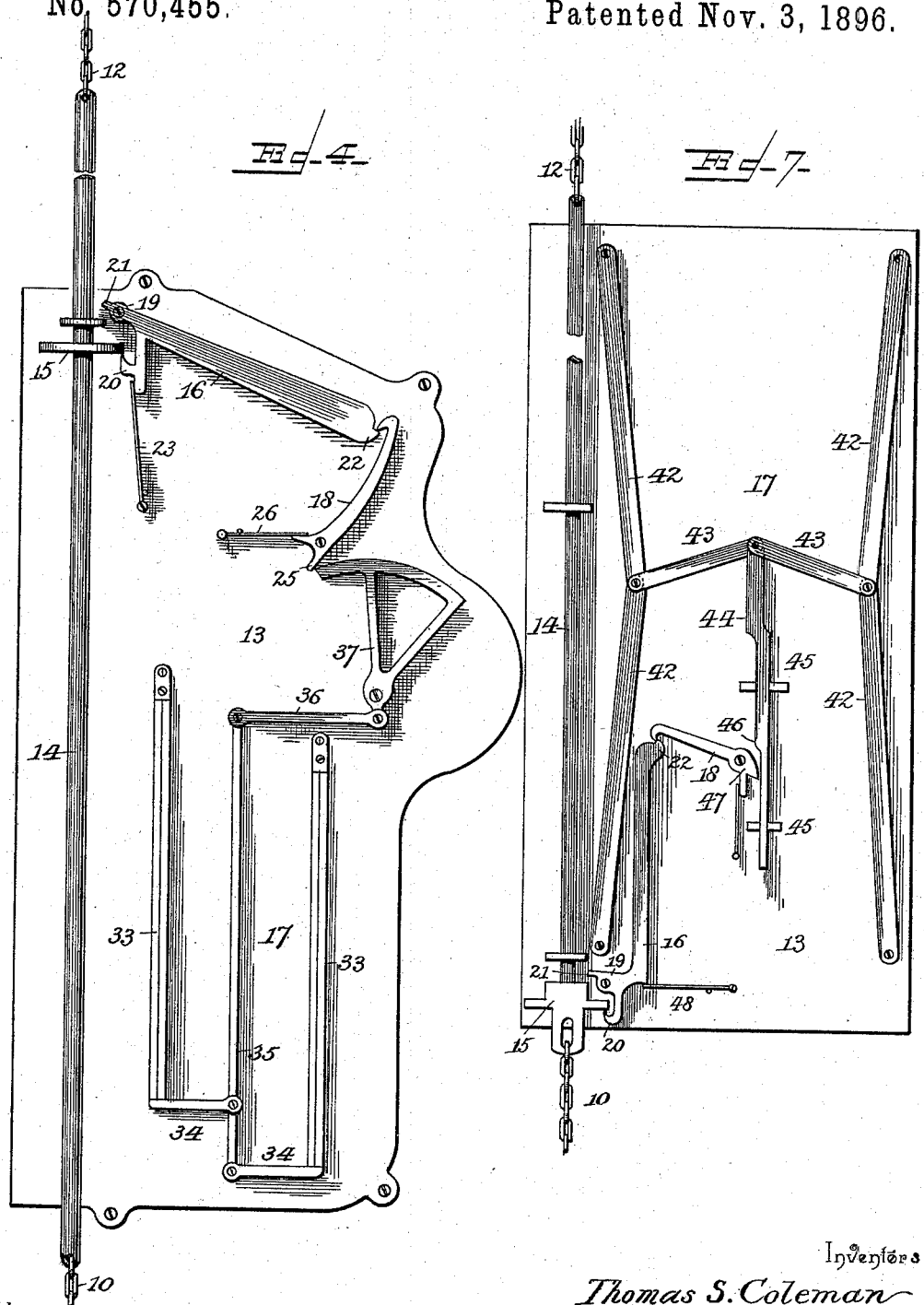

ABSENT# UNITED STATES PATENT OFFICE.

THOMAS S. COLEMAN AND WILLIAM P. COLEMAN, OF MARSHALL, TEXAS.

PLUMBING SYSTEM.

SPECIFICATION forming part of Letters Patent No. 570,455, dated November 3, 1896.

Application filed April 30, 1895. Serial No. 547,701. (No model.)

*To all whom it may concern:*

Be it known that we, THOMAS S. COLEMAN and WILLIAM P. COLEMAN, citizens of the United States, residing at Marshall, in the county of Harrison and State of Texas, have invented a new and useful Plumbing System, of which the following is a specification.

The present invention relates to improvements in plumbing systems whereby the service-pipes will automatically drain themselves when a sufficiently low temperature is reached to congeal the water contained therein, thereby obviating frozen pipes and the resultant damage incident thereto.

The aim of the invention is to combine with a plumbing system a self-closing cock which is in communication with the waste or sewer pipe, and which under normal conditions is held open by a trigger mechanism, and which is released when a temperature approximating the freezing-point is reached, thereby permitting the said cock to automatically close and shut off the supply of water and at the same time drain the system of pipes of the water remaining therein. The releasing device may be any contrivance affected by the change in the temperature so as to vary from a normal position, advantage being taken of this change of position to release the trigger mechanism, whereby the self-closing and draining cock is released to attain the desired results, and for the sake of simplicity of illustration and description this releasing device will be referred to as a "thermostat."

The improvement consists, essentially, of the novel features and the peculiar construction and combination of the parts which hereinafter will be more fully described and claimed, and which are shown in the accompanying drawings, in which—

Figure 1 shows a plumbing system embodying the essence of the invention. Fig. 2 shows the mechanism for holding the self-closing and draining cock of the system open under normal conditions. Fig. 3 shows a modification, in which the thermostat has positive attachment with the trigger mechanism. Fig. 4 shows a further modification, whereby the movement of the thermostat is augmented. Fig. 5 shows an arrangement similar to Fig. 4, the operating parts being differently related. Fig. 6 shows an arrangement whereby the thermostat can be located at a distant point from the trigger mechanism and is operatively connected therewith by electrical devices. Fig. 7 shows a different arrangement and combination of thermostat.

In Fig. 1 is shown a simplified form of plumbing system illustrating the application of the invention, whereby both the hot and cold water pipes are drained and cut off from the source of water supply when the temperature reaches approximately the freezing-point. The numeral 1 indicates a self-closing stop and waste cock located at any convenient point, preferably at or about the lowest position of the system of pipes, and which has connection with the water-main by means of the pipe 2, and with the sewer or other point of discharge by means of the waste-pipe 3ª. This self-closing stop and waste cock may be of any desired pattern commonly used for the purpose of cutting off the supply of water to a system of pipes and at the same time draining off the water remaining therein after the supply is shut off. In order to avoid confusion, the cold-water pipes will be designated throughout this figure by the reference-numeral 3 and the hot-water pipes by the numeral 4. The cold-water pipe, after leaving the cock 1, extends to the boiler 5 and makes connection with the water-back of the stove 6 in the ordinary manner, and has branch pipes which run to the various fixtures 7, provided in the dwelling or building. The hot-water pipe 4 connects the boiler 5 with the water-back of the stove 6 in the usual way, and after leaving the boiler 5 is connected by various branch pipes with the fixtures to be supplied with hot water, and connects at its lower end, as shown at 8, with the lowest portion of the cold-water pipe 3, so that when the cock 1 is closed the supply of water will not only be shut off from the hot and cold water pipes, but the latter will be drained of all water remaining therein, thereby preventing any possible injury from frozen pipes.

The mechanism for holding the cock open under normal conditions and for releasing the same when the temperature reaches 30° or thereabout, which is the freezing-point, is conveniently located and is attached to the stem or other movable part of the said cock by means of a chain 10, which in the present instance is shown passing over a guide-pulley 11. Under normal conditions, that is, when the temperature is above the freezing-point, the cock 1 is held open by means of the mechanism 9, and when the temperature falls to nearly a freezing-point the cock 1 is released and automatically closes, thereby shutting off the supply of water to the system of pipes and at the same time draining them in the manner previously stated. Suppose it be required to draw water while the temperature is at or below the freezing-point, provision must be had for opening the cock 1 to admit a supply of water to the system of pipes. This is effected in a convenient manner by providing a chain or cord 12, which is connected at one end to the mechanism 9, and through it with the chain 10, and has its opposite end extended within convenient reach to be drawn upon to create a tension on the chain 10 and open the cock 1, as will be readily understood. After the chain 12 is released and the temperature is still at or near the freezing-point the mechanism 9 will refuse to act, thereby permitting the cock 1 to again close. When the temperature rises above the freezing-point and the chain 12 is pulled upon, the mechanism 9 will engage with the movable bar or rod and hold the cock 1 open. Thus it will be seen that the mechanism for releasing and holding the self-closing stop and waste cock open is controlled by the thermal changes of the atmosphere, and that in freezing weather the supply of water to the system of pipes will be cut off and the said pipes drained, thereby obviating the inconvenience and expense attendant upon frozen pipes as generally experienced.

The mechanism for holding the self-closing stop and waste cock open will be provided in different specific forms, some of which are shown in the accompanying drawings and all of which will have features in common and substantially the same and which will be designated in the several views by the same reference-numerals, and in which 13 is the casing for inclosing the operating parts and 14 the movable bar or rod operating in suitable guides in the casing and connected at one end with the chain 12 and at the opposite end with the chain 10, and which is provided with a suitable stop 15 to be engaged by a trigger 16 to support the part 14 against the influences tending to close the cock 1, so as to hold the latter open under normal conditions. A releasing mechanism is provided to disengage the trigger 16 from the stop 15 under abnormal conditions, and consists, essentially, of a thermostat 17, which may assume various forms, and a trip 18, likewise provided in different shapes and actuated by means of the thermostat when the predetermined temperature is reached to cause a disengagement of the trigger from the stop 15, thereby releasing the cock 1 and permitting it to close for the purpose aforesaid. In Figs. 2, 4, 6, and 7 the trigger 16 is similarly constructed and comprises a head portion 19, having a hooked end 20 to engage with the stop 15 and a forward projection 21, which normally projects across the path of the stop 15 to be engaged thereby to reset the parts and limit the upward movement of the bar or rod 14 when the latter is moved by a pull upon the chain 12, and the rear end of the trigger has a shoulder 22, which is engaged by the trip 18 to hold the trigger in operative relation against a retracting-spring 23, provided to throw the trigger out of working position when the trip 18 occurs in such a position as not to engage with the shouldered end 22 of the trigger.

The trip shown in Fig. 2 has a hooked end to engage with the shouldered end of the trigger and has butt projections 24 and 25, the former being engaged by a spring 26, which projects the trip within the path of the shouldered end of the trigger, and the latter projection 25 being adapted to be engaged by an arm 27 of a bell-crank lever, which has its opposite arm 28 adapted to be engaged by the free end of the curved thermostat 17. As the temperature lowers the thermostat contracts until its end engages with the arm 28 and moves the bell-crank lever to actuate the trip 18 and release the trigger from the stop 15, thereby permitting the closing of the cock 1 in the manner set forth.

Referring to Fig. 3, the trigger 16 has one end hook-shaped and adapted to engage with the stop 15, being held in engagement therewith by a spring 29, and has an extension 30 at its butt-end to be engaged by the curved end of the approximately triangular-shaped trip 18, the latter having a portion 31, projecting rearwardly from its pivotal point and connected by a link 32 with the movable end of the curved thermostat. In this mechanism the contraction of the thermostat, due to the decrease of temperature, pulls upon the link 32 and moves that end of the trip in engagement with the extension 30 outward, thereby disengaging the trigger from the stop 15, as will be readily understood. In this construction the stop 15 is tapering or conical-shaped, so that on the upward movement of the bar or rod 14 it will ride past the hooked end of the trigger and permit the latter to spring under and engage with the stop 15 under normal conditions, as herein stated.

Fig. 4 shows a construction of trigger and trip approximating the corresponding parts disclosed in Fig. 2, and which operate in precisely the same manner, the arrangement of the springs 23 and 26 being slightly different. The thermostat comprises two thermal bars 33, disposed in parallel relation and connected at their free ends by arms 34 with a bar 35, which has connection by means of a link 36 with the short arm of a segment-lever 37, the latter engaging with the butt projection 25 of the trip, so as to disengage the latter from the trigger when the thermostat reaches the proper point of contraction incident to the reduction of the temperature to the freezing-point.

The thermostat illustrated in Fig. 5 is precisely the same as that disclosed in Fig. 4, and the bar 35 thereof is connected by a link 38 with the short arm of a segment-lever 39, which latter has a cut-away portion 40, which, when it comes opposite the end of the trigger, will permit the latter under the influence of a spring 41 to drop and disengage its hooked end from the stop 15, thereby permitting the release of the rod or bar 14 for the purpose aforesaid.

The thermostat shown in Fig. 7 comprises oppositely-disposed pairs of metal bars 42, which are pivoted together at their respective inner ends and which have their outer ends connected by fixed pivots to the casing, and these bars unitedly are longer than the distance between their respective end pivots, so that under a comparatively high temperature the pairs of bars will bulge inwardly at their middle points. Links 43, pivoted at their inner ends, have pivotal connection at their outer ends with the pairs of bars 42, the connection being had by means of the same pivots which secure the inner ends of the bars together. A reciprocating bar 44 has attachment with the links 43 and is directed in its movements by conveniently-disposed keepers 45, and this bar 44 has an enlarged portion 46 to engage with the butt-end 47 of a lever or trip 18, whose hooked end engages with the shouldered end of the trigger 16 and holds the latter against the tension of the spring 48, by means of which the trigger is held from engagement with the stop 15. On the lowering of the temperature the pairs of bars 42 will contract and straighten the links 43 and produce a longitudinal movement of the bar 44, whose enlarged portion 46 will engage with the trip 18 and disengage the latter from the trigger and admit of the spring 48 regaining itself and disengaging the trigger from the stop 15, whereby the cock 1 will perform the functions hereinbefore stated.

The construction shown in Fig. 6 illustrates the thermostat located at a distant point from the trigger-actuating mechanism, whereby the movable bar or rod 14 is held in check against the tendency of the cock 1 to close. An electromagnet 49 is conveniently disposed to operate upon the trip 18, and has one terminal 50 in electrical connection with one pole of a battery or other electrical generator 51, and has the other terminal wire 52 electrically connected with one member 53 of the thermostat, the opposite member 54 of the thermostat being electrically connected with the opposite pole of the battery by means of the electrical conductor 55. In this form of the mechanism the members 53 and 54 approach each other, and when the predetermined temperature is reached for releasing the rod 14 the circuit will be completed and the electromagnet 49 energized and attract one end of the trip 18 and release the trigger and the said rod, thereby permitting the self-closing stop and waste-cock to operate in the manner hereinbefore stated.

It must be understood that in equipping dwellings and buildings with the improved system of pipes a valve will be disposed at the highest point of the system to form a vent for the admission of air when the supply is cut off, thereby permitting the draining of the pipes. This valve may be of any desired pattern of check-valve which will open automatically when the pressure within the system of pipes is cut off, and is shown at 56 in Fig. 1, which is the highest point of the system.

The invention is designed for either hot or cold water or both and is illustrated in its application with the latter system, and in adapting the same to the many arrangements in vogue it is manifest that changes in the form, proportion, and the minor details of construction may be resorted to without departing from the principle or sacrificing any of the advantages of this invention.

In practice it has been found necessary to interpose a check-valve of any construction between the hot-water and the cold-water pipes to prevent the mixing of the waters, and this check-valve is located in proximate relation to the point of connection between the hot-water pipe 4 and the cold-water pipe 3, as indicated at 58. This check-valve must be so set as to admit of the draining of the hot-water pipes when the pressure is turned off from the system.

Having thus described the invention, what is claimed as new is—

1. The combination with a system of service-pipes for supplying water to a building or dwelling, of a self-closing stop and waste cock located at substantially the lowest point of the system of pipes, a movable bar or rod operatively connected with the said cock, a trigger having a hook to engage with and hold the bar or rod in check and having a projection to be engaged by a portion of the said bar to reset the trigger, and a thermal contrivance adapted to release the trigger when a temperature approximating the freezing-point is reached, substantially as described for the purpose set forth.

2. The combination with a system of service-pipes for supplying water to a building or dwelling, and a self-closing stop and waste cock located at substantially the lowest point in the system of pipes, of a movable bar or rod having a stop and operatively connected with the said cock, a pull chain or cord having direct connection with the bar and extending within convenient reach, a trigger to engage with the stop on the movable bar and hold the cock open under normal conditions, and having a projection to be engaged by the stop on the said movable bar so as to reset the parts when the said pull-chain is drawn upon, and a thermal appliance for releasing the trigger when a temperature approximating the freezing-point is reached, substantially as and for the purpose set forth.

3. In a system of pipes for supplying water to a dwelling or building, the combination of a self-closing stop and waste cock located at the lowest point of the system, a movable bar operatively connected with the said cock and having a stop, a trigger having a hooked end to engage with the said stop and a projecting portion to limit the movement of the said bar in one direction, a trip to maintain the trigger in working position, and a thermostat for actuating the trip to release the trigger, substantially as described for the purpose set forth.

4. The combination with a system of pipes for supplying water to a building or dwelling, of a self-closing stop and waste cock located in the system, a movable bar operatively connected with the said cock, a pull chain, or cord, having attachment with the said bar and extending within convenient reach, a trigger having a hooked end to engage with a stop on the movable bar and having a projecting portion to engage with and limit the movement of the said bar in one direction, a trip having a hooked end to engage with the end of the trigger and having a projecting butt portion, and a thermostat constructed to operate upon the projecting butt portion of the trip and release the latter from the trigger, whereby the movable bar is liberated and the said cock free to operate, substantially in the manner set forth for the purpose specified.

In testimony that we claim the foregoing as our own we have hereto affixed our signatures in the presence of two witnesses.

T. S. COLEMAN.
W. P. COLEMAN.

Witnesses:
W. T. TWYMAN,
E. B. GREGG.